(12) United States Patent
Solis

(10) Patent No.: US 6,230,439 B1
(45) Date of Patent: May 15, 2001

(54) METHOD OF BLOCKING ROOT TRAVEL FROM A FIRST SUBTERRANEAN AREA TO A SECOND SUBTERRANEAN AREA

(76) Inventor: George Patrick Solis, 12463 Barryknoll, Houston, TX (US) 77024

( * ) Notice: Subject to any disclaimer, the term of this patent is extended or adjusted under 35 U.S.C. 154(b) by 0 days.

(21) Appl. No.: 09/407,689

(22) Filed: Sep. 28, 1999

Related U.S. Application Data

(62) Division of application No. 09/028,149, filed on Feb. 23, 1998, now Pat. No. 6,108,972.

(51) Int. Cl.$^7$ .......................... A01B 79/00; A01B 79/02; A01C 1/00; A01G 3/00; A01H 3/00

(52) U.S. Cl. ............................................ 47/58.1; 47/65.6

(58) Field of Search .................... 47/58, 58.01, 58.25, 47/58.26, 58.27, 73, 78, 76

(56) References Cited

U.S. PATENT DOCUMENTS

| | | | |
|---|---|---|---|
| 2,436,770 | * | 2/1948 | Hill et al. .................... 47/33 |
| 4,098,021 | * | 7/1978 | Gruber ....................... 47/78 |
| 4,574,522 | * | 3/1986 | Reiger et al. ............... 47/78 |
| 4,884,367 | * | 12/1989 | Lawton ...................... 47/78 |
| 4,941,282 | * | 7/1990 | Milstein ..................... 47/58 |
| 5,103,588 | * | 4/1992 | Reiger ....................... 47/78 |
| 5,393,313 | * | 2/1995 | Reiger ....................... 47/58 |

* cited by examiner

Primary Examiner—Peter M. Poon
Assistant Examiner—Judith A. Nelson
(74) Attorney, Agent, or Firm—J. M. (Mark) Gilbreth; Gilbreth & Associates, P.C.

(57) ABSTRACT

A device for retaining garden beds, retaining water, and/or blocking plant roots, with the device having two connected reinforcing members with a liquid permeable member positioned between the reinforcing members. A method of building a garden bed includes using the device around the perimeter of a bed. A method for building a pond or stream includes using the device around the perimeter of the pond or stream. Finally, a method of blocking root travel includes burying the device to block travel.

7 Claims, 2 Drawing Sheets

METHOD OF BLOCKING ROOT TRAVEL FROM A FIRST SUBTERRANEAN AREA TO A SECOND SUBTERRANEAN AREA

This application is a Division of Ser. No. 09/028,149 filed Feb. 23, 1998, now U.S. Pat. No. 6,108,972.

BACKGROUND OF THE INVENTION

1. Field of the Invention

The present invention relates to apparatus for and methods of bracing soil, retaining water, and blocking roots. In another aspect, the present invention relates to flexible reinforcement member apparatus for and methods of bracing soil, retaining water, and blocking roots. In even another aspect, the present invention relates to flexible reinforced water pervious reinforcement member for and methods of bracing soil, retaining water, and blocking roots. In still another aspect, the present invention relates to a flexible woven water permeable material having reinforcement structure on each side for and methods of bracing soil, retaining water, and blocking roots.

2. Description of the Related Art

Ornamental gardening, as opposed to produce gardening, around a residence has been a popular activity for hundreds of, years. Traditional English gardening has its roots in the aristocratic gardens of royal home owners and slowly became practiced on a smaller scale around typical residences.

Perusal of the volume of gardening books and magazines in any bookstore reveals that gardening is indeed very popular in the United States.

Many garden purists believe that a garden is not complete without water. However, providing water in a garden, whether as a pond or running stream, is a complicated task which presents many problems.

Other inherent gardening problems include maintaining plants and/or their roots in a desired section of the garden, and bracing soil around the edges of beds.

There are many prior art patents and articles directed to providing water in a garden, maintaining plants and/or their roots in a desired section of the garden, or bracing soil around the edges of beds.

U.S. Pat. No. 2,436,770, issued Feb. 24, 1948 to Hill, et al, discloses a garden layout and apparatus for separating the soils and plants in the garden. The garden includes various beds containing cultivated plants, walkways, and grass borders, all of which are separated by separators. The separators are described as being preferably formed of paper or fiber board of laminated or corrugated construction, saturated, impregnated or coded, with a material such as asphalt that is resistant to water, to acid, to alkalines, plant food, corrosion and the like. The separator is described by being prepared by dipping or otherwise coating or impregnating a laminated or corrugated fiber paper or board of conventional structure with the asphalt or like material, with the treated board preferably being of such ductility that it can be formed in strips and rolled for ease in handling, shipping or storage. As a method of insertion, the separator is inserted in a ditch or other depression formed around a garden bed of any desirable shape or size, with the fiber paper or board separator readily being conformed by bending to the desired shape as it is inserted. Alternatively, it is disclosed that the garden bed may be excavated and the interior of the wall of the bed lined with one or more strips of the separator material and the bed refilled with a suitable treated earth for the plants to grow therein. It is also disclosed that the separator may be utilized to prevent growing tree roots from encroaching upon the cultivated bed. Finally, it is disclosed that the separator may be adapted for use in nurseries and breeders gardens where the roots of each variety of plant may be separated as to assure that the roots are as true as to variety. Specifically, the roots of a plant or shrubbery enclosed in a ball of earth and the earth provided with a peripheral covering of the separator.

U.S. Pat. No. 3,315,408, issued Apr. 25, 1967 to Fisher, discloses an article which will prevent or eliminate soil erosion by providing a disintegratable covering over areas subject to soil erosion which have been seated and which will provide a protection against erosion for these areas until erosion preventing vegetation has germinated beneath the protective covering. The covering is broadly disclosed as including all types of inter-engaged or inter-connected filaments, yarns, fibers and the like which will sufficiently cohere as to form a substantially continuous blanket or covering. The material utilized has a controllable or predetermined rate or time for disintegration under various agents including in particular a biochemical reaction caused by enzymatic action of microorganisms such as soil bacteria, when the covering is placed on the ground in contact with the soil. Disclosed as a further essential feature of the covering is that the protective covering blanket provided shall include hollow core soluble or disintegratable filaments, yarns or fibers formed from soluble cellulosic derivative material in which are filled with a fluid material selected from the group consisting of fertilizers, pesticides and weed killers in which have walls rupturable and disintegratable by the biochemical reaction caused by the micro organisms in the ground when the yarns are placed on the ground in contact with the soil so as to release at a predetermined time the fluids in the yarns with contact of the fluids with the ground.

U.S. Pat. No. 4,421,439, issued Dec. 20, 1983 to ter Burg, et al, discloses a sporting fabric for bearing bulk material such as sand, gravel, stones, clay, loam, or other bulk material, and a method of building a road, embankment, a dike, a dam or some other structure form from bulk: material. The supporting fabric is characterized in that the yarns extending the warp direction of the fabric are formed by straight warp yarns and binder warp yarns, the straight warp yarns each having a higher strength than the binder warps yarns, with construction being such that when the fabric is subjected to a tensile load in the warp direction, the straight warp yarns bear a higher proportion of the tensile load than the binder warp yarns, preferably at least 80% of the tensile load. For the method of stabilizing soil and/or building a road embankment, a dike, a dam or some other structure formed of bulk or other material, the supporting fabrics are provided with transverse portions. The supporting fabrics are placed horizontally with one or more layers of the bulk material formed on top of the horizontally lined supporting fabric. The supporting fabrics may also be placed horizontally between various horizontal layers of the bulk material. The transverse partitions extend perpendicularly away from the supporting fabric and help support the bulk material.

U.S. Pat. No. 5,358,356, issued Oct. 25, 1994 to Romanek, et al, discloses an erosion control mat formed of a scrim having a light weight web secured thereto and a method of applying said erosion control mat to a soil surface to control erosion. The grid sides of the scrim should be selected to provide a uniform reinforcing and be large enough to allow easy plant penetration through the grid, with the maximum grid opening in the range of about $1/16$ of an inch, with a preferred size in the range of about ¾ of an inch to about ⅝ of an inch. The composite fabric selected will allow for ready penetration of plants, light, and water through the erosion control mat. Although the scrim and the lightweight web may be assembled and bonded together by any suitable technique known to those of skill in the art, including, but not limited to chemical, thermal, or mechanical bonding methods, it is presently preferred to bond the scrim to the lightweight web by needle punching the lightweight web to the scrim. The erosion control mat is suitable for installation in a great variety of situations where the ground has been disturbed and the soil is subject to erosion including, but not limited to the replanting of highway road embankments, construction sites, mining and mining reclamation sites, park areas, and landfills. It is generally preferred to install the erosion control mat on a soil surface that has been smoothed with readily available equipment such as graters, tractors with box blades, or other suitable implements. The soil surface to be replanted can be seated before or after applying the erosion control mat.

U.S. Pat. No. 5,393,313, issued Feb. 28, 1995 to Reiger, discloses an improved method of growing nursery stock for transplantation which basically comprises forming a plurality of spaced holes in the ground, placing a porous fabric blanket over and into the holes whereby depressions in the blanket conform with the holes. The porous fabric blanket has sufficient strength to constrict penetrating roots whereby root growth below the blanket is restricted and enlarged root nodule formation and root branching are promoted within the depression above the blanket. When the plants are ready for transplantation, they are readily and easily removed from the depressions in the blanket.

U.S. Pat. No. 5,575,112, issued Nov. 19, 1996 to Scheubel, discloses a method for controlling growth of plant roots, which consist in positioning close to the root plants a water permeable, non-woven fabric made of synthetic fibers coated or otherwise impregnated with a water insoluble polymeric binder in which is disbursed a water insoluble inorganic copper compound in an amount effective to stop root growth, the binder being bound to the fabric and thus retaining and refining the copper compound to the fabric, whereby, in use, the coated fabric stops the growth of undesirable rootlets or radicles which come in contact thereto. "Gardens, Pools and Fountains", Ortho Books, 1988, discloses several methods for installing a garden pool, including use of a flexible liner, or the use of a prefabricated pool. This book teaches that the pool walls are cut into the soil and should have a slope of about 20°, or even more if the soil is loose or sandy. The lining is then placed flush against the slopping soil. It further teaches that at the edges of the pool, there should be at least 6 inches of the flexible liner showing all around the edges of the pool with this extra liner secured by, digging a shallow trench around the edge of the pool, and placing the extra liner in the trench, and then covering it with soil, stones, or paving material.

"Water In The Garden", James Allison, 1991, discloses several methods of installing a pool in a garden including use of pool liners, preformed pools, and concrete pools. While noting that liner ponds are the easiest of the types of ponds to install, and that liners are usually the most economic method of pool construction, it further notes that to their disadvantage, liners can be punctured by sharp implements, sharped edge stones and the roots of certain invasive plants, such as bamboo, and that the shelves around liners may tend to lose their shape with time. This book does suggest that if sharp tipped plant roots are prevalent, that one lay a barrier persistent herbicide under the liner, and to prevent soil slippage that one utilize a mix of fairly stiff concrete containing fine aggregate, which is worked into the soil to provide a layer that is about 1 to 2 inches thick, around the top edge, on the shelves, and on any steep sides of the pond. This book recommends concrete collars for steep sided pools and heavy forms of edging. "The Pond: Doctor", Helen Nash, 1994, discloses methods of constructing a pond in a garden including the use of a preformed pond or a liner. This book discloses the use of hidden liner edging, which it describes as a lining of mortared bricks treated for lime, or simple edge construction which it describes as stiff concrete mixed into the soil around the edge of the pond beneath the pond liner. This book further discloses that deterioration of pool edging may occur from moisture in the surrounding soil that allows the edge to settle, from porous soil composition that cannot support heavy rocks, or from heavy stone that is used with a deep or straight sided pool, with suggestions made to affect repairs including the use of a concrete collar, concrete reinforced soil, or hidden liner construction. It further teaches that unstable capstones in the liner edge can be embedded in a trench concrete installed a few inches from the pool edge, with the concrete reinforced with steel mesh or rebar.

Conventional soil bracing products which are commercially available to the recreational gardener are generally made out of either solid metal or plastic. For example, LineUps™ earth retainer beams are available from Serenity Ponds & Streams of Seal Beach, Calif., and the 1997 Gardener's Supply Company of Burlington, Vt. offers recycled plastic retainer beams with preformed corner fasteners.

However, many of these commonly available braces suffer from several deficiencies. These commercially available solid braces do not allow water to easily escape out of the bed, resulting in unhealthy plants, bogging soil, and plant root rot. In some instances the added weight of the retained water can threaten the soil brace. It is also noted that conventional soil bracing products are typically available in four to six inch widths that do not offer elevated bed support. It is even also noted that conventional products such as steel edging or thick plastic edging can be heavy, very hard or impossible to bend, and very difficult to adapt to a particular geometric arrangement as needed. It is still also noted that many of the conventional bracing products such as steel edging require special expensive metal cutters for onsite fabrication. It is yet also noted that conventionally available steel edging is generally heavy and expensive to ship.

Thus, in spite of the advancements in the prior art, there is still a number of deficiencies in the prior art requiring a need for improvement in methods of and apparatus for providing water in a garden, maintaining plants and/or their roots in a desired section of the garden, and bracing soil around the edges of beds.

There is another need in the art for a garden landscaping soil brace and/or water retaining brace which is long lasting, strong and durable.

There is even another need in the art for a garden landscaping and/or water retaining brace which allows the flow of water, nutrients and fertilizers in both directions across the brace.

There is still another need in the art for a garden landscape brace and/or water retaining brace which can easily be adaptable to various widths and lengths for adaptation to various landscape needs.

There is yet another need in the art for a garden landscape brace and/or water retaining brace which is flexible to allow the landscaper to adapt the brace to curves as well as straight lines without any special fittings that are required by some conventional products.

There is even still another need in the art for a garden landscape brace and/or water retaining brace which is easy to cut and install resulting in decreased installation time, and which does not require special expensive metal cutters.

There is even yet another need in the art for a garden landscape brace and/or water retaining brace which is of lighter weight, resulting in reduced shipping charges and lower costs to the ultimate purchaser.

There is still even another need in the art for a garden landscape brace and/or water retaining brace which is less costly than the current all metal braces.

Finally, there is still yet another need in the art for a garden landscape brace and/or water retaining brace which is not too obtrusive or noticeable when utilized in a garden to provide more of a natural garden appearance.

These and other needs in the art will become apparent to those of skill in the art upon review of this specification, including its drawings and claims.

SUMMARY OF THE INVENTION

It is an object of the present invention to provide for improvement in bracing soil around the edges of beds, providing water in a garden, and maintaining plants and/or their roots in a desired section of the garden.

It is another object of the present invention to provide for a garden landscaping brace and/or water retaining brace which is long lasting, strong, and durable. One embodiment of the brace of the present invention is made of either galvanized wire mesh or durable plastic mesh both of which resist rotting or rusting. It is even another object of the present invention to provide for a landscape garden brace and/or water retaining brace which allows the flow of water, nutrients and fertilizers in both directions across the brace. One embodiment of the brace of the present invention is meshed and allows the flow of water, nutrients, and fertilizers into and out of a garden bed. Because water can flow out of the bed, there is not the added weight of water impinging against the brace, and there is better soil drainage producing healthier plants and less root suffocation.

It is still another object of the present invention to provide for a landscape garden brace and/or water retaining brace available in various widths and lengths for adaptation of various landscape needs. For certain selected materials, the brace of the preset invention can be easily cut and tailored to the job at hand. Furthermore, the brace of the present invention is useful in building elevated beds.

It is yet another object of the present invention to provide for a landscape soil brace and/or water retaining brace which is flexible and bendable allowing the landscaper to adapt the brace to any type of curvilinear shape as well as straight lines without any special fittings that are usually required by some convention braces.

It is even still another object of the present invention to provide for a landscape garden brace and/or water retaining brace which is relatively easy to install resulting in decreased installation time. One embodiment of the brace of the present invention is made out of metal or plastic mesh that is easily cut utilizing commercially available cutters that are commonly available at any hardware store. One embodiment of the brace of the present invention can be easily cut along both its width and its length to suit the job at hand, resulting in an, ease of installation and a decrease in installation time as compared to conventional steel edging type products.

It is even yet another object of the present invention to provide for a landscape garden brace and/or water retaining brace that is lightweight and therefore easy to handle during installation, and less expensive to ship, than more conventional steel type edging products.

It is still even another object of the present invention to provide a landscape garden brace and/or water retaining brace which is affordable for use by the recreational gardener or commercial landscaper. The cost of the present invention is controlled by utilizing relatively inexpensive metal or plastic mesh along with an inexpensive weed blocker fabric. Additionally, construction of the present invention is also relatively inexpensive. The brace of the present invention will be utilized to replace conventional products such as steel reinforced cement that is currently being used to edge butyl liner ponds and ornamental garden streams.

It is still yet another object of the present invention to provide for a landscape garden brace and/or water retaining brace which is not too obtrusive or noticeable in such a manner as to produce a natural garden appearance. The brace of the present invention is intended to blend in with the landscape and produce a natural garden appearance.

These and other objects of the present invention will become apparent to those of skill in the art upon review of this specification, including its drawings and claims.

According to one embodiment of the present invention, there is provided a gardening apparatus. The apparatus generally includes first and second reinforcing members, and positioned there between, a liquid permeable member. The first and second reinforcing members may also be liquid permeable, and are preferably a grid, mesh or screen made of metal or plastic. The liquid permeable member is preferably a fabric, more preferably a standard commercially available gardening fabric.

According to another method of the present invention, there is provided a method of building a garden bed. The method generally includes positioning a gardening apparatus, as described above, to form a garden bed perimeter defining the garden bed. The method further includes anchoring a portion of the garden apparatus with soil in a trench or excavation. The method finally includes providing soil within the garden bed.

According to even another embodiment of the present invention, there is provided a method of building a water retaining member. The method generally includes the step of forming an excavation, that is, in the shape of the desired pond, lake or stream. The method next includes positioning a gardening apparatus as described above, around the perimeter of the excavation. The method also includes anchoring a portion of the retaining apparatus with soil in a trench or excavation. The method finally includes providing water within the excavation.

According to still another embodiment of the present invention, there is provided a method of blocking plant root travel from a first subterranean area to a second subterranean area. The method generally includes forming an excavation between the first and second subterranean areas. The method also includes positioning the above described gardening apparatus in the excavation. The method finally includes, burying the retaining member with soil.

DETAILED DESCRIPTION OF THE INVENTION

Soil Brace

Figure 1:
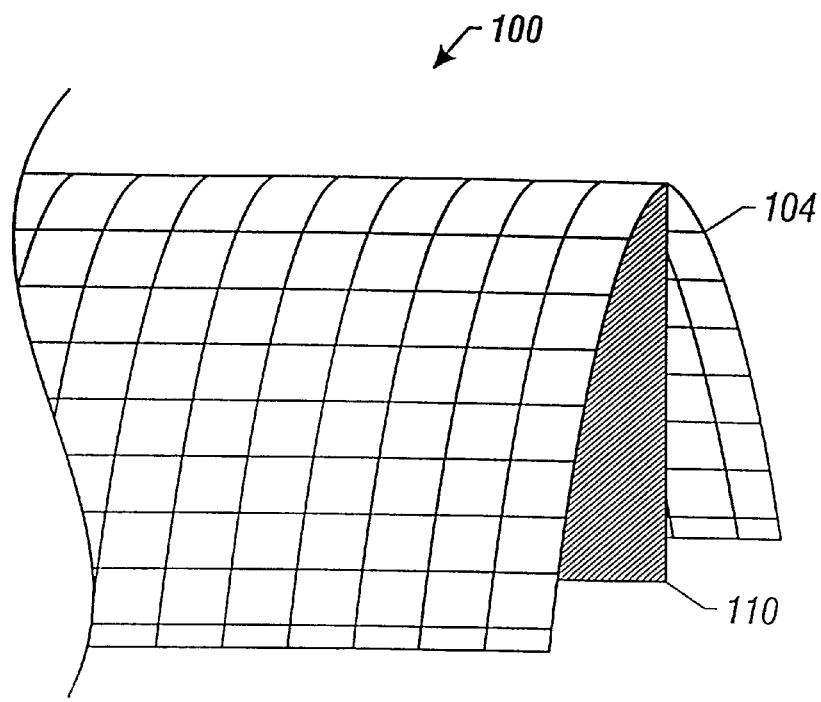
FIG. 1 is an illustration of soil brace 100 of the present invention, including barrier 110 and reinforcement member 104.
Figure 2:
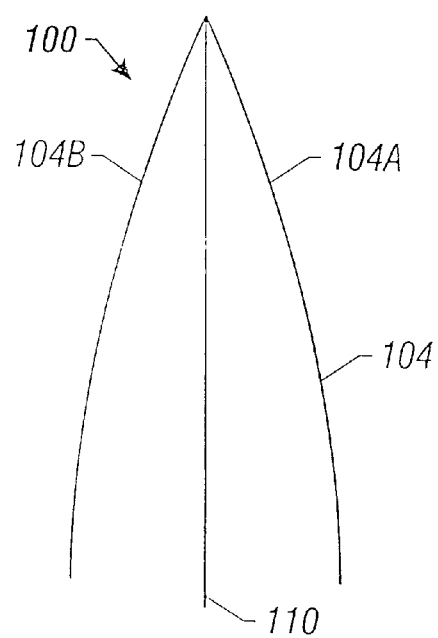
FIG. 2 is a side view of soil brace 100 of FIG. 1, showing barrier 110 and reinforcement member 104.

Referring now to FIGS. 1 and 2 there is shown an illustration of and side view of, respectfully, soil brace 100 of the present invention. In the embodiment as shown in FIGS. 1 and 2, soil brace 100 includes barrier 110 and reinforcement member 104.

In the practice of the present invention, it should be understood that barrier 110 may be of any physical structure suitable for the intended garden or water application of soil brace 100. For example, it is generally desired that barrier 110 be suitable for preventing penetration by roots and/or vegetation, while still allowing water nutrients and fertilizers to pass through the barrier 110. Such a structure is preferably woven or non-woven.

In the practice of the present invention, any material may be utilized as the material for barrier 110 provided that the selected material is suitable to withstand long term contact with the soil, and if it is to be utilized in an agricultural or garden setting, that such barrier 110 be suitable to withstand exposure to the various chemicals that are utilized in agricultural or garden settings such as herbicides, insecticides, fertilizers, plant foods, and the like.

It should be understood that while barrier 110 may be comprised of a material that is inherently resistant to exposure to such soil and the various chemicals, lesser materials may be utilized if such are provided with a suitable coating or protective layer suitable to protect against exposure to such soil and chemicals.

While any material meeting the requirements as specified above may be utilized as barrier 110, it is preferred in the practice of the present invention that barrier 110 be constructed from a polymeric material. Non limiting examples of polymeric materials which are suitable for forming a woven barrier 110 of the present invention include polyester, polyamid, polypropylene, polyethylene, nylon, rayon, and polyamids.

In some instances, it may be desired to provide barrier with certain selected chemicals, for example, herbicides, insecticides, fertilizers, plant foods, and the like, which diffuse into the soil over time. The barrier may also be provided with a water insoluable inorganic copper compound in an amount effective to stop root growth as disclosed in U.S. Pat. No. 5,575,112, issued Nov. 19, 1996 to Scheubel, herein incorporated by reference.

The reinforcement member 104 of the present invention, may be made of any suitable material that will provide the necessary reinforcement to barrier 110. Of course, the amount of reinforcement necessary will depend upon the inherent properties of barrier 110, and the application to which soil brace 100 is being applied.

As with barrier 110, reinforcement member 104 should comprise a material suitable to withstand long term exposure to soils and resist rotting, rusting and/or degradation. Where soil brace 100 is to be utilized in agricultural or garden settings, it should also be adequately resistant to exposure to chemicals which are normally found in such agricultural and garden settings, such as fertilizers, herbicides, insecticides, plant foods, and the like.

Reinforcement member 104 may be formed from a suitable metal, polymeric material, treated wood, composite material, or ceramic as desired. Preferably, reinforcement member 104 comprises metal or polymeric material. More preferably, reinforcement member 104 comprises galvanized wire or a durable plastic.

In the embodiment of brace 100 as shown in FIGS. 1 and 2, reinforcement member 104 comprises a first grid member 104A and a second grid member 104B between which is sandwiched barrier 110. It should be noted that reinforcement member 104 may comprise to join together first grid member 104A and second grid member 104B as shown in FIG. 1, or it may comprise two disjointed members first grid member 104A and second grid member 104B. The grid sizes of reinforcement member 104 is generally selected to provide a uniform reinforcing with grid openings in the range of about $1/16$ inches to about 2 inches, preferably in the range of about $1/8$ inches to about 1 inches, and even more preferably in the range of about $1/4$ inches to about $1/2$ inches.

While in the embodiment of brace 100 as shown the grid of reinforcement member is of a uniform rectangular shape, there is no requirement that the grid be so limited, as any other suitable grid shape may be utilized.

It should also be noted that while the embodiment of brace 100 is shown as having a first grid member 104A and a second grid member 104B between which is sandwiched barrier 110, it should be understood that any number of grid members and barriers may be utilized, with any desired arrangement of grid members and barriers utilized. As non-limiting examples, one or more barriers in the interior may be sandwiched between one or more grid members on the outside, or barrier layers may be interspersed between any number of grid members.

Methods of manufacturing such a reinforcement member 104 are well known in the art and any suitable method which would result in the reinforcement member 104 as described may be employed for the practice of the present invention.

Barrier 110 and reinforcement member 104 are assembled by any suitable technique to form soil brace 100. The most simple assembly technique would include sandwiching barrier 110 between reinforcement member 104 and suitably interlocking the edges of one-half of reinforcement member 104 with the other half of reinforcement member 104, for example by twisting or otherwise interlocking the edges together. Another suitable technique would include sandwiching barrier 110 between reinforcement members 104A and 104B, and affixing barrier 110 to reinforcement member 104, for example through the use of stitching, fusing, threading, anchoring, gluing, or adhering.

In the practice of the present invention, reinforcement member 104 and barrier 110 may be assembled into soil brace 100 by any suitable technique known to those skilled in the art, including, but not limited to chemical thermal, or mechanical (including sonic and needle punch techniques) bonding methods wherein the soil brace 100 formed thereby allows for the ready penetration of water but prevents penetration of plants and roots through soil brace 100.

Soil brace 100 of the present invention is believed to be long lasting, strong, and durable. The more preferred embodiment of soil brace 100 comprising either galvanized wire mesh or durable plastic mesh will resist rotting, rusting or other degradation.

As barrier 110 and reinforcement member 104 allow for flow of water there through, soil brace 100 will allow the flow of water, nutrients and fertilizers into and out of any garden beds made therefrom. Therefore, the added weight of water in the garden bed will not cause undue pressure against soil brace 100 used to make such bed, and as water can escape out of the bed there is better soil drainage producing healthier plants and less root suffocation, and/or rot.

Soil brace 100 may be made to any suitable standard commercial length, thickness and width depending upon the desires of the application by appropriate selection of the length, thickness and width of the barrier and reinforcement members. The materials of construction for both reinforcement member 104 and barrier 110 are also generally selected so that soil brace 100 may be easily cut by the end use gardener utilizing conventional tools without the need to utilize special expensive metal cutters. The materials of construction are also selected to allow for easy cutting to decrease installation time. The materials of construction for soil brace 100 are also preferably selected to provide a soil brace 100 which is flexible and bendable thereby allowing the end use landscaper to adapt the soil brace 100 to curvilinear as well as straight lines without requiring any special fittings as are required by some conventional products.

According to the present invention the materials with construction for soil brace 100 are also preferably selected to provide a soil brace 100 which is generally light weight to provide for ease of handling during installation, and to provide for reductions in shipping costs. Preferably, the materials of construction for soil brace 100 and its method of assembly are selected to provide a product that is relatively affordable to the end use landscaper.

The colors for soil brace 100 are generally selected to provide for a soil brace which is generally to obtrusive or noticeable thereby producing a natural garden appearance. Non-limiting examples of suitable colors include most shades of green, most shades of brown, and black. Preferably soil brace 100 is substantially the color of the soil which it is bracing.

Applications for Soil Brace 100

Soil brace 100 finds utility in a wide variety of applications.

Support Soil

One envisioned application of soil brace 100 is to support soil, as for example, at the edge of a garden bed or to support soil at the edge of a liner pond or stream, by vertical placement of soil brace 100 next to the soil being supported.

Where additional support is needed for soil brace 100, support stakes, as a non-limiting example, 2"x2" wooden stakes, may be placed at appropriate intervals on one or both sides of soil brace 100.

For elevated beds, the ability of water to freely flow through soil brace 100, as opposed to conventional solid-type landscape edging, means that there is not the added weight of water in the bed to weigh against the brace, as would occur with the conventional edging. Use of soil brace 100 will provide an environment for healthier plants with better drainage resulting in less root rot and suffocation.

The flexibility of soil brace 100 allows for the construction of a wide variety of regular and irregular geometric and other complicated shapes of ponds, streams and garden beds.

A garden bed may be constructed by simply placing anchoring one edge of soil brace 100 a suitable distance in the ground in the desired bed shape and then filling the created shape with the desired type of soil or garden mix. By eliminating the need to excavate the entire volume of the bed, bed building is easier, less laborious, less expensive, and provide good drainage for a healthier plant environment.

Soil brace 100 should allow for the construction of narrow, elevated garden beds in areas where there ordinarily would not be enough space.

It is believed that soil brace 100 would provide for containment of soil within the configured garden bed to reduce spillage of soil and mulch onto driveways, walkways, pathways, patios, or onto grass, particularly after heavy rains. The garden thus remains neater, tidier, and cleaner.

Pond Construction

One embodiment of the pond construction method of the present invention will now be described by reference to FIG. 3.

Figure 3:
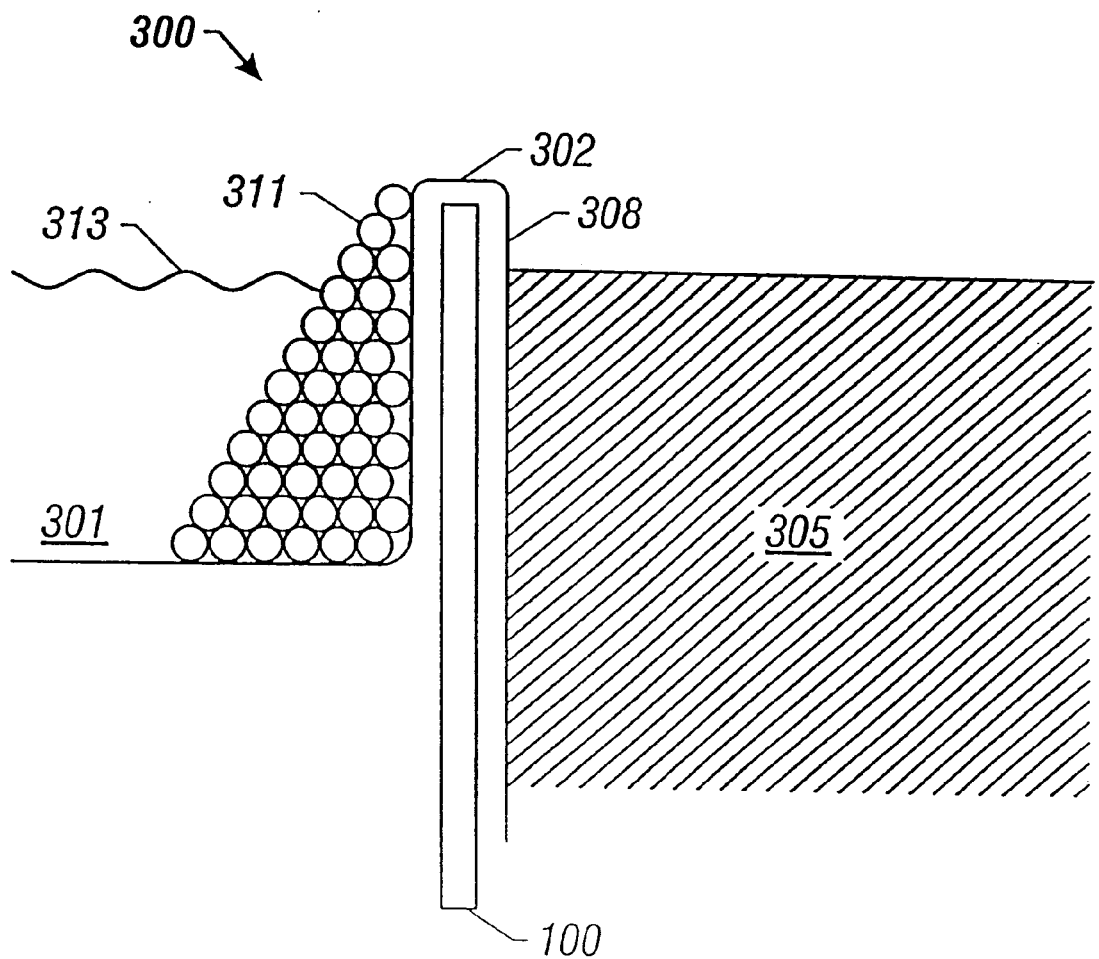
FIG. 3 is a side view of pond 300 consisting of pond excavation 301 of any desired shape having a pond edge or perimeter 302, soil brace 100 of the present invention, and pond retaining wall 305.

There is shown in FIG. 3 pond 300 consisting of pond excavation 301 of any desired shape having a pond edge or perimeter 302, soil brace 100 of the present invention, and pond retaining wall 305.

In the method of the present invention, pond excavation 301 is first excavated to the desired depth profile and shape. Next, around perimeter 302 of pond excavation 301 soil brace 100 is vertically positioned and anchored in the soil as shown. In most instances, the top edge of soil brace 100 is positioned in the range of about 2 to about 3 inches above the water and soil level. The anchoring is generally accomplished by positioning part of soil brace 100 into the soil, although such bracing can also be reinforced by cement in the soil and/or other mechanical reinforcement. For example, 2"x2" wooden stakes may be positioned one either or both sides of soil brace 100. The top portion of soil brace 100 is generally allowed to extend above the water or soil level a few inches as desired or even flush with the water level.

Once soil brace 100 is positioned around perimeter 302, pond liner 308 is then positioned in pond excavation 301 and over soil brace 100 as shown in FIG. 3. Soil brace 100 may be provided with an exterior that is rough to both help anchor soil brace 100 in the ground, and to help anchor pond liner 308 against soil brace 100. Such roughness may be provided by an irregular surface having a desired surface roughness, or by providing projections on the surface.

Dirt 305 is then provided to bury both soil brace 100 and pond liner 308 as shown. A multiplicity of rocks, stones or other material 311 may optionally be provided to give the edge of pond 300 a more realistic look.

The perimeter 302 where pond liner 308 is exposed may be unfinished, or may be finished by covering with plants, decorative stone or paving or cement collar.

Pond liners are well known in the art, and any suitable type of pond liner may be used in the practice of the present invention. Polyethylene has been used as a pond liner material since the 1940s, but its disadvantages are that it is easily punctured, can stretch very thin, and is a difficult material to join. However, if polyethylene is utilized, a gauge in the range of about 1,000 to about 1,500 is suggested. While polyvinyl chloride liners are more expensive than standard polyethylene liners, they are much stronger. Such PVC liners have semi-elasticity and are more resistant to ultra violet damage, although PVC is longer lasting than polyethylene, still becomes brittle with age and is difficult to prepare once it has lost it flexibility. Suitable thicknesses for PVC are generally in the range of about 0.5 to about 0.75 mm. Twin laminate PVC reinforced with mesh is also available for use as a pond liner. The most preferred material for use as a pond liner is a butyl liner made from a synthetic liner, (isobutylene and isoprene). Butyl liners have excellent flexibility and elasticity and a very long life span.

Root blocking

Another envisioned application of soil brace 100 is vertical placement of soil brace 100 to restrict the horizontal growth or spread of weeds, plants and/or their roots. Such root blocking may be either to keep certain plants in or to keep out certain plants.

For example, soil brace 100 may be placed around selected plants to keep them within or out of a certain area. For example, soil brace 100 has been utilized to keep the highly invasive canna lily within a garden bed, to keep Liriope from advancing into a garden bed, and around rose beds to block surrounding tree roots from growing into the rose bed and thereby decreasing the chance of losing soil nutrients to the tree roots.

As another example, soil brace 100 has been used to dwarf a tree by placing it around the tree to restrict the reach of its roots and therefore of its canape (and thus its size).

It is also believed that soil brace 100 may be utilized with seedlings in nursuries. For example, to surround seedling plants to prevent intermingling of the roots, or as shown in U.S. Pat. No. 5,393,313, herein incorporated by reference.

Alternatively, soil brace 100 may be utilized to prevent other plant roots from coming into certain areas, as for example; blocking tree roots from entering a rose garden, or perhaps keeping roots away from plumbing or drainage pipes, sidewalks, or a structural foundation.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which this invention pertains.

I claim:

1. A method of blocking root travel from a first subterranean area to a second subterranean area, the method comprising:
   (a) forming an excavation between first and second subterranean areas;
   (b) positioning a retaining member in the excavation, wherein the retaining member comprises (i) a first reinforcing member, (ii) a second reinforcing member connected to the first reinforcing member wherein at least one of said first and second reinforcing members is resistant to degradation and (iii) a liquid permeable member positioned between the first and second reinforcing members; and
   (c) burying the retaining member with soil.

2. The method of claim 1 further comprising:
   (d) providing a support for the retaining member by positioning a support on at least one side of the retaining member.

3. The method of claim 1 wherein the first and second reinforcing members are each liquid permeable.

4. The method of claim 1 wherein the first and second reinforcing members each comprise a grid.

5. The method of claim 1 wherein the first and second reinforcing members each comprise a metal or plastic.

6. The method of claim 1 wherein the liquid permeable member comprises a fabric.

7. The method of claim 1 wherein the first and second reinforcing members each comprise a metal or plastic grid, and wherein the liquid permeable member comprises a fabric.

* * * * *